Nov. 8, 1955   E. A. STRATTMAN   2,722,797
SAFETY CUTTER BLADE FOR ROTARY TYPE LAWN MOWERS
Filed Nov. 6, 1953
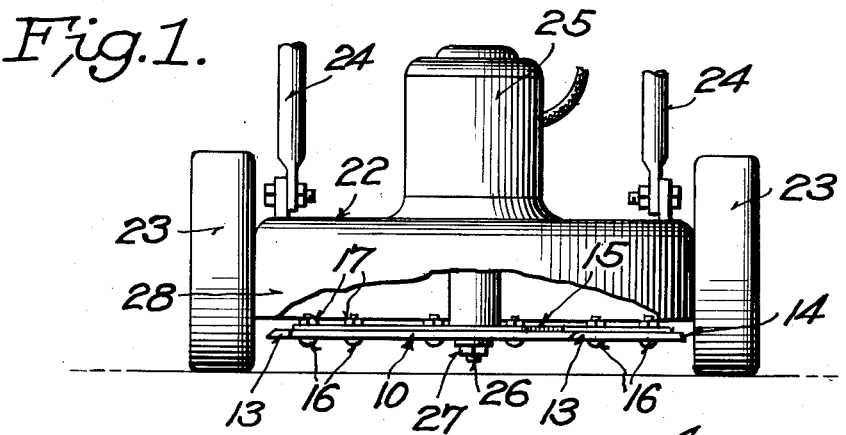
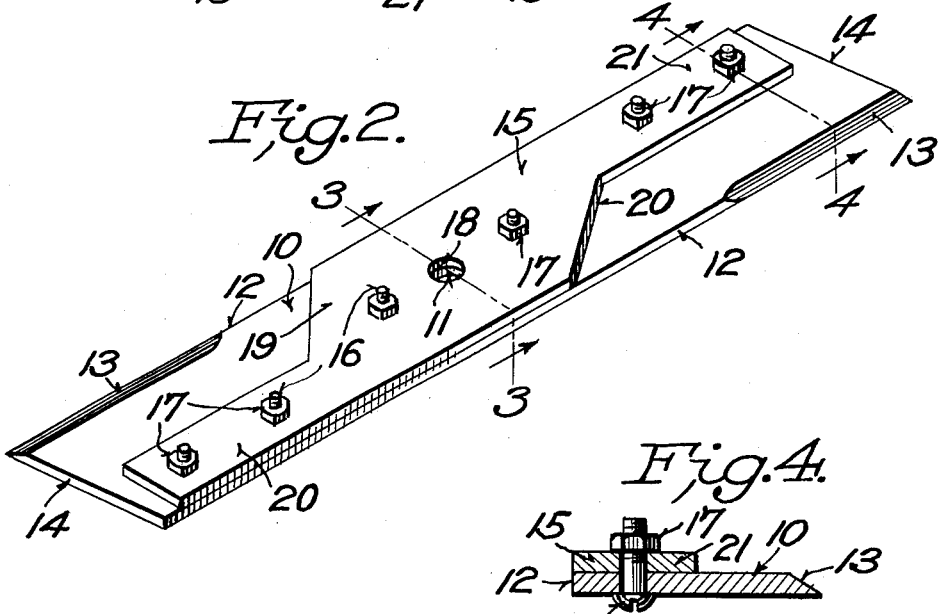
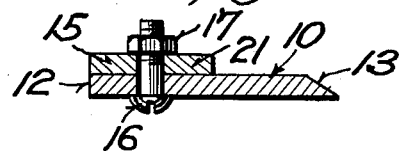
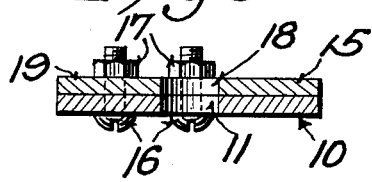
INVENTOR
EDWIN A. STRATTMAN,
BY H. B. Wellson & Co.
ATTORNEY

United States Patent Office 2,722,797
Patented Nov. 8, 1955

2,722,797

SAFETY CUTTER BLADE FOR ROTARY TYPE LAWN MOWERS

Edwin August Strattman, New Orleans, La.

Application November 6, 1953, Serial No. 390,639

1 Claim. (Cl. 56—295)

This invention relates to lawn mowers of the so-called rotary type, and more particularly to the cutter blades therefor.

Such a rotary mower has a bar-like cutter blade fixed at its center to the lower end of a vertical shaft which is driven at a high speed by a suitable motor so that the blade rotates in a horizontal plane close to the ground and the blades of grass and weeds are cut by beveled cutting edges at the end portions of the blade. These cutter blades or bars are made of very hard and brittle metal, and it quite often happens that when the blade strikes a stone or other hard and fixed obstruction, the blade will break and a piece of substantial size will be thrown off into space with terrific force because of the high speed of rotation of the cutter. When that occurs there is great danger of the operator or a person nearby being seriously cut, as well as the likelihood of damage to the sheet metal casing on the mower.

The object of the invention is to provide an improved safety cutter blade that will substantially eliminate the above stated hazard inherent in the now commonly used cutter blades of rotary type lawn mowers.

The invention contemplates the addition to either the upper or the lower face of the present hard metal blade of a soft pliable metal plate which is coextensive in length with the blade and which is fixed to it at longitudinally spaced points so that should a substantial part or section of the blade break off between two adjacent fixed points, the broken part will be prevented from flying off into space by reason of its attachment to the soft metal plate.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a front elevation of one form of rotary mower showing the application of the improved cutter blade, the mower being conventionally illustrated and parts being broken away;

Fig. 2 is an enlarged perspective view of the improved safety cutter blade; and

Figs. 3 and 4 are enlarged detail cross sectional views taken respectively on the lines 3—3 and 4—4 of Fig. 2.

Referring more in detail to the drawings the numeral 10 denotes the body portion of a form of cutter blade now extensively used on rotary mowers. It is a straight, flat, substantially rectangular strip or bar of very hard and brittle steel. At its middle is an opening 11 to receive a power driven shaft to which it is suitably fixed for rotation therewith. The straight and parallel side edges 12 of the blade along opposite sides of the latter are beveled as at 13 to form the cutting edges. These cutting edges extend inwardly from the ends 14 of the blade any desired distance but most of the cutting is done at the end portions of the blade because of its high speed of rotation. These cutter blades do not cooperate with a fixed cutter bar as in a reel type lawn mower but sever the blades of grass by a slicing action due to a high speed of rotation, usually of more than 2,000 revolutions per minute.

In the practice of my invention I rigidly fasten to either the top or the bottom face of the blade a plate 15 of material which will stand considerable bending and twisting before it will break. I preferably use soft pliable steel and mount it on the top or upper face of the blade 10, as shown. The plate 15 is coextensive or substantially coextensive in length with the blade body and it contacts smoothly throughout its length with the blade whatever the longitudinal shape of the latter may be. The plate is securely fastened to the blade at longitudinally spaced points by bolts, rivets or similar fastening means, any number of which may be used. As shown, a plurality of threaded bolts 16 are disposed in alined holes in the blade and plate and receive nuts 17 so that the two will be firmly fastened together. At the center of the plate is an opening 18 which registers with the opening 11 and receives the power driven shaft. The central portion 19 of the plate 15 is preferably coextensive in width with the blade but its end portions are cutaway along its opposite sides, as at 20, to form reduced or narrow end portion 21 spaced laterally from the beveled cutting edges 13 so that the blade may be repeatedly sharpened.

In Fig. 1 I have conventionally illustrated one form of lawn mower in which my improved safety blade may be used. It has a body 22 mounted on wheels 23, handle means 24 by which it may be pushed or pulled, and a suitable motor 25. The motor drives a shaft 26 to which the safety blade may be fixed in any suitable manner. The holes or openings 11, 18 receive the shaft 26 and the blade may be secured by a nut 27 or other fastening means. On the body 22 over the cutter blade is a suitable sheet metal guard or casing 28 beneath which the blade rotates.

It will be seen that by attaching the plate of soft pliable material to the body of the brittle metal blade at longitudinally spaced points, should any substantial portion or section of the blade break between two fastenings 16, the broken portion will be held to the plate 15 by the fastening which connects it to the plate thus preventing the broken section from getting free and flying off through space. When bolts are used as the fastening elements, a broken blade may be readily replaced by a new blade. The plate also reinforces the blade and its shape is such that the blade may be repeatedly sharpened.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

A high speed cutter blade for a rotary type lawn mower in which a horizontally rotating cutter blade is fixed at its center to a vertically disposed power driven shaft for rotation at a high speed in a horizontal plane, said cutter blade comprising an elongated body made of a single flat sheet of hard and brittle metal, said body being of substantially rectangular shape with parallel side edges and with a centrally positioned hole to receive a driving shaft, one of said side edges at each end of said body sheet being beveled to provide cutting edges extending inwardly from the ends of the blade along its opposite sides, a plate made of a single flat piece of soft and pliable material substantially coextensive in length with said body sheet and disposed lengthwise of and in contact with one face of said body sheet, said plate having its intermediate portion coextensive in width with said body sheet and provided with a shaft receiving hole in alinement with the first mentioned hole, the end portions of said plate along its opposite sides being cutaway to provide the plate with reduced end portions which are laterally off-set from said beveled cutting edges, and a plurality of fastening elements rigidly uniting said plate to said body sheet at longitudinally spaced points substantially throughout the length of said plate for the purpose set forth.

References Cited in the file of this patent

UNITED STATES PATENTS

| | | |
|---|---|---|
| 2,083,103 | Steiner | June 8, 1937 |
| 2,167,222 | Shelor | July 25, 1939 |
| 2,403,236 | Phelps | July 2, 1946 |
| 2,527,472 | Wolf | Oct. 24, 1950 |
| 2,539,619 | Goodall | Jan. 30, 1951 |
| 2,572,298 | Alvarez | Oct. 23, 1951 |
| 2,576,884 | Leigh | Nov. 27, 1951 |